June 14, 1932.  A. J. STRONG  1,862,811
JUNCTION BOX
Filed March 30, 1931    2 Sheets-Sheet 1
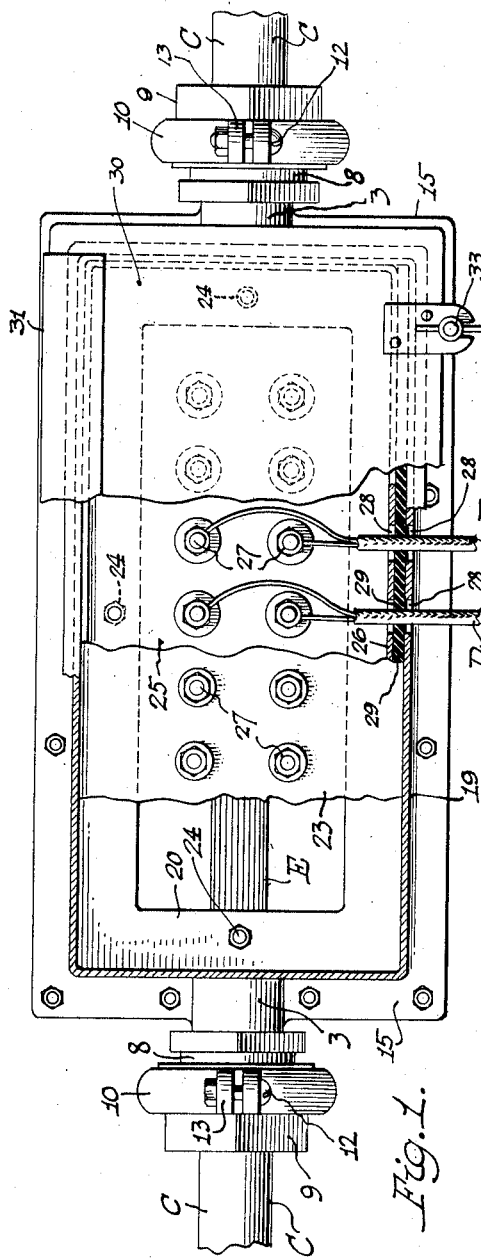
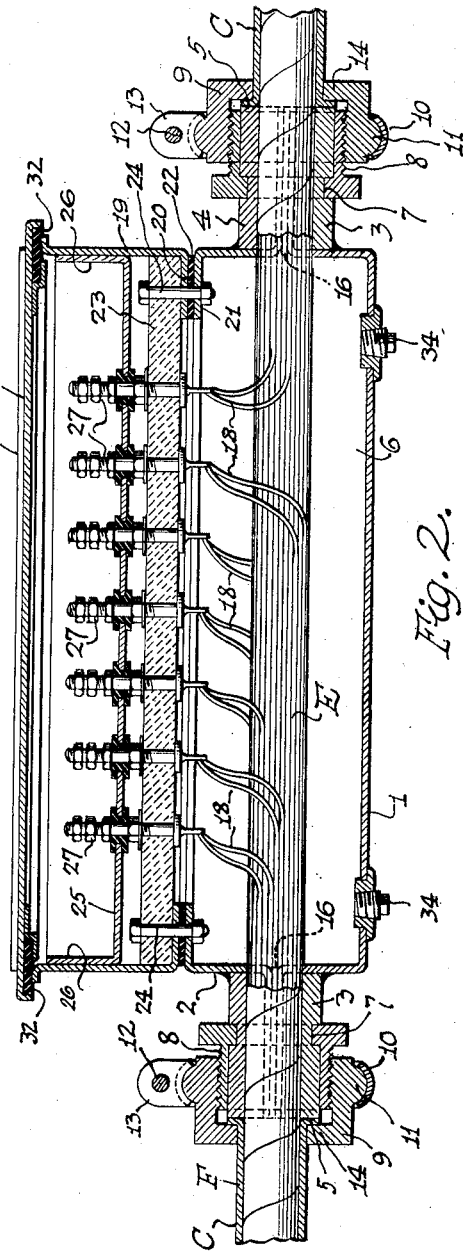
INVENTOR
Arthur J. Strong,
BY
ATTORNEYS June 14, 1932.  A. J. STRONG  1,862,811
JUNCTION BOX
Filed March 30, 1931    2 Sheets-Sheet 2
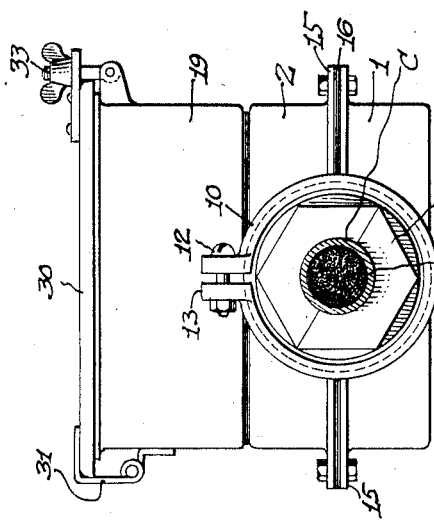
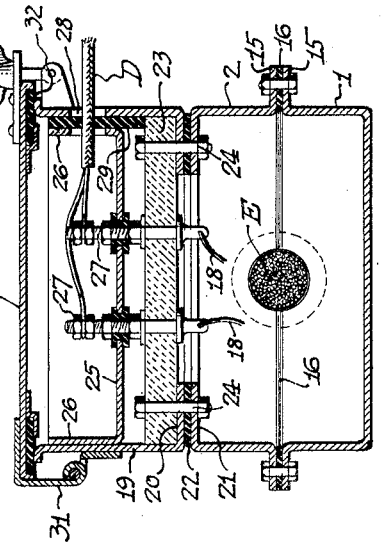
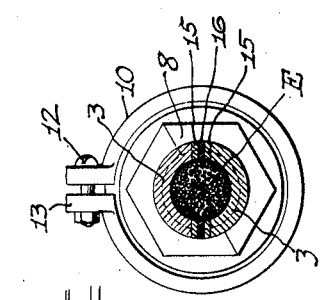
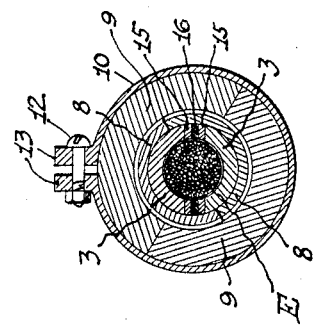
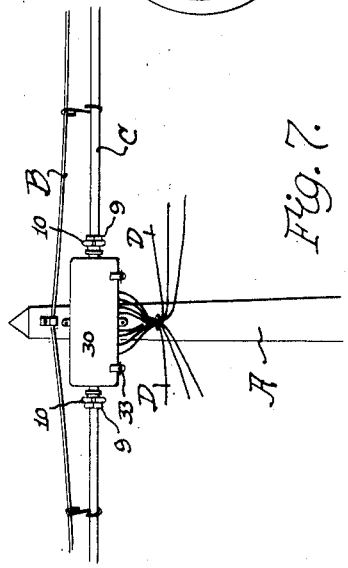
INVENTOR
Arthur J. Strong,
BY
ATTORNEYS Patented June 14, 1932

1,862,811

UNITED STATES PATENT OFFICE

ARTHUR J. STRONG, OF DETROIT, MICHIGAN

JUNCTION BOX

Application filed March 30, 1931. Serial No. 526,406.

This invention relates to a junction box, and more particularly to an outside box for use upon poles forming the supports for a continuous main cable and from which cable it is desired to take off one or more leads, such as in telephone or other electrical transmission systems.

An object of the present invention, is the provision of a box suitable for the purpose, which is so constructed that it may be readily applied to a continuous main, armored cable without severing the cable or any of the wires embodied in such a cable, and which wires may be exposed within said box by removing a portion of the cable armor, the construction being such as to firmly connect and hold the ends of the severed armor and thoroughly protect the exposed wires from dampness or other elements which might cause short circuiting, said box being arranged to receive and firmly hold said cable against endwise movement through the box and protect the exposed wires of the cable within said box. A further object is to provide, in connection with such a box, readily accessible means for connecting lead wires to the exposed wires of the cable, and to provide a construction for such box which makes it readily applicable to a continuous cable and insures against short circuiting and movement of the cable or its armor relative to the box.

With the above and other ends in view, the invention consists in the matters hereinafter set forth and more particularly pointed out in the appended claims, reference being had to the accompanying drawings in which—

Figure 1 is a plan view, with portions broken away and in horizontal section, of a box illustrative of an embodiment of the present invention;

Fig. 2 is a longitudinal section through the same, substantially upon the line 2—2 of Figure 1;

Fig. 3 is an end elevation of the same;

Fig. 4, a transverse section, substantially upon the line 4—4 of Figure 1;

Fig. 5, a detail of the clamping and holding means on the ends of the box, for the cable and its armor;

Fig. 6 is a sectional detail, substantially upon the line 6—6 of Fig. 2; and

Fig. 7 is a view illustrative of the application of the box to an outside cable supported in the usual manner by the usual poles.

Referring more particularly to Fig. 7, A indicates the usual poles carrying the usual wire B from which the transmission cable, indicated as a whole by the letter C, is suspended in the usual manner. It is desirable that lead wires D, shown in Figs. 1 and 4, be connected to certain of the continuous wires E which make up the cable, and which cable also includes the usual outside tubular sheath or armor F formed of a metal composition, to protect the several wires E from the elements.

In order that this junction box may be readily applied to the continuous cable C without severing the cable or disturbing the wires E thereof, the box, which is preferably formed of sheet metal, is divided into mating parts adapted to receive and clamp between them, the cable C, these parts 1 and 2 being provided at each end thereof, with a semi-tubular member welded or otherwise secured at one end within a semi-circular opening in the edge of each end wall of said box parts, these members 3 and 4 being secured to and projecting outwardly from the ends of said parts 1 and 2 respectively, and together forming a complete tube at each end of the box, said tubes having an internal diameter substantially equal to the diameter of the cable without its armor F. Therefore, in placing the box on the cable, the cable armor is cut away for a distance a little less than the over-all length of the box and projecting tubular end members, and the ends of the armor then flanged as at 5 so that the upper half 2 of the box may be placed on the cable with the flanges 5 engaging the ends of the members 4, and then the lower half 1 is brought up beneath the cable with its members 3 encircling the lower half of the cable opposite the members 4, and the opposed halves of the tubes, then firmly clamped together by means hereinafter described. The box is thus quickly and easily applied to the cable without the necessity for severing the same, with said cable extending through the lower chamber 6 of the box formed by the mating halves 1 and 2 which meet in the plane of the dividing line between the halves of the tubular clamping members.

To firmly and detachably secure these half tubes 3 and 4 together, each of said half tubes is formed with a groove 7 to mate with the like grooves in the opposed half tubes, and an externally screw-threaded sleeve member 8 which is made in like halves and provided with an internal end rib to engage said groove 7, is placed upon each tubular cable clamping member, and then a nut 9 which is also formed in separable halves, is placed around the cable and the two halves of this nut then firmly secured together by a clamping band 10 which is curved transversely to fit over an external annular rib 11 in the nut halves 9. The nut halves being thus firmly secured together by said band, the ends of which are drawn toward each other by a clamping screw 12 passing through ears 13 on the ends of the band, said nut halves together form a complete nut which is then screwed upon the externally screw-threaded sleeve halves 8 to draw these halves together and in turn force the semi-tubular clamping members 3 and 4 toward each other and secure the two parts 1 and 2 of the box together with the cable clamped therebetween.

The internal rib on the sleeve 8 engaging the groove 7 in the tubular clamping hub formed by the members 3 and 4 on the box walls, prevents endwise movement of said sleeve 8 when the nut 9 is turned on, and to firmly hold the ends of the cable armor F, each nut is provided with an inwardly extending flange 14 to engage the flanges 5 on the ends of said armor and firmly clamp said flanges 5 between the ends of the clamping members 3 and 4 and said flanges 14 on said nuts. This makes a water tight joint between the armor ends and the box, preventing moisture from getting into said box, and firmly securing said armor to the box.

To further guard against moisture getting into the chamber 6 formed by the parts 1 and 2 of the box, the meeting edges of these parts are flanged outwardly as at 15 and if found desirable, a packing strip 16 may be placed between these flanges and the flanges firmly secured together by bolts 16 passing therethrough. This not only makes a tight joint between the box parts 1 and 2, but also secures these parts firmly together. If found desirable, this packing strip may be continued between the opposed edges of the sleeve members 3 and 4 as shown at 17 in Fig. 6.

The parts 1 and 2 of the box are thus readily applied to the cable C and firmly clamp the cable therebetween within the tubular end clamping members 3 and 4 on the ends of the box and with the exposed wires E of the cable extending across the chamber 6, from end to end thereof, where short leads 18 may be attached to these wires E in the usual manner.

To facilitate the connecting of the lead wires D to the short lead wires 18 within the chamber 6 and to protect these leads and the interior of the box against dampness, etc., an upper or top box member 19 is provided. This top box member is preferably formed of sheet metal, the same as the two lower members 1 and 2, and is provided with an inwardly extending wide bottom flange 20 to rest upon a like flange 21 on the upper edge of the wall of the box member 2, a packing strip or gasket 22 being placed between said flanges to make a tight joint, and an insulating board or block 23 of a size to fit closely within the box member 19, is seated upon the flange 20 and firmly secured in place by bolts 24 passing through said block and said flanges and packing strip, thus not only securing said block in place, but also firmly uniting the upper box 19 to the lower box 2.

To further protect the wiring and connections in the box against water getting in, a plate or pan 25 of a size to fit closely within the upper box 19, is forced downward therein, the edges of this pan being formed with wide upstanding flanges or walls 26 to frictionally engage the walls of said box 19 and hold the pan in place with its bottom spaced a short distance from the insulating board 23, and extending through holes in this bottom, are terminal posts 27 which also extend through openings in the insulating board with their lower ends in the upper part of the chamber 6 and formed to provide for the attachment thereto, of the short lead wires 18. A series of holes 28 is provided in one wall of the box 19 and mating holes are formed in the opposed wall 26 of the pan, there being a strip of rubber 29 interposed between these walls and covering the holes in both walls. The lead wires D are carried into the pan 25 and made fast to the posts 27 in the usual manner, by puncturing the strip 29 opposite the holes 28 and forcing the wires through these punctures so that the rubber strip very closely engages the wires where they pass through the openings 28, thus precluded the entrance of any dampess into the box through these holes.

The upper box 19 is closed by a cover 30 hinged at 31 to one side of the box and provided with a packing strip 32 on its lower side to engage the upper edges of the walls of the box 19 and make a tight joint therewith when the cover is firmly clamped down by the clamp screws 33.

The exposed wires E of the cable C are, with this arrangement, confined in the chamber 6 formed by the mating box-halves 1 and 2, and all the connections to these wires are made in said chamber and attached to the posts 27, ready for use when desired, it being only necessary to insert the leads D, open the cover 30 and attach their inner ends to the posts. As all the connections to the wires E are made at one time and all within the chamber 6, after these connections are made, this chamber may be filled, with a liquid insulating compound, through openings in the bottom wall of the chamber, which openings are closed by screw plugs 34. Perfect insulation for the cable wires and connections is thus insured and no dampness can get into the chamber. This arrangement of all cable connections being made in a closed chamber also facilitates the making of these connections, as immediately after connecting the wires 18 to the wires E, heated air or other drying fluid may be introduced into the chamber 6 through the openings closed by the plugs 34, to dry the wire connections and thus further insure against faulty connections. With this arrangement, all connections to the cable are made and ready for use so that it is only necessary, when it is desired to connect in a lead D, to puncture the rubber strip 29, force the lead therethrough and connect it to the proper binding post 27. The work of installation and the making of connections is therefore greatly facilitated, proper connections and insulation are insured and a much stronger and more rigid installation is secured than by the usual practice.

Changes may be made in the construction and arrangement of parts within the scope of the appended claims, without departing from the spirit of the invention, and I do not, therefore, limit myself to the particular construction shown.

Having thus fully described my invention, what I claim is:

1. In a junction box, the combination of mating box parts, tubular members on the ends of said parts and each formed in parts meeting in the plane of the meeting plane of said box parts and to receive and support a cable extended across the chamber formed by said box parts, a sleeve member on each of said tubular members rotatable thereon and engaged therewith to prevent longitudinal movement of said sleeve member upon said tubular members, said sleeve member being divided longitudinally into parts, a nut on each of said sleeve members, said nut being divided longitudinally into parts, and a clamping band encircling each of said nuts and detachably holding said parts thereof together.

2. In a junction box, the combination of a box forming a chamber and provided at its opposite ends to receive and hold a cable extended across said chamber with leads from the wires of said cable in said chamber, an insulating block above said chamber and closing the same, terminal posts on said block for connection with said leads in said chamber, said box having openings therein opening into said chamber for the introduction of a fluid into said chamber, and means for closing said openings.

3. In a junction box, the combination of mating box parts, tubular members projecting from and secured to the ends of said box parts, said tubular members being each formed in halves with the mating edges of said halves in the plane of the mating edges of said box parts to receive between said parts of said tubular members, an armored cable extended across the chamber formed by said box parts, a sleeve member on each tubular member and divided longitudinally into separable parts, each of said tubular members being formed with an exterior groove extending therearound, an inwardly extending rib on each sleeve member to engage in said groove in each tubular member, said sleeve members being externally screw-threaded, a nut member to engage and screw upon each of said sleeve members, and an inwardly extending rib on each nut member to oppose an end of each tubular member and clamp therebetween a flange on the armor of said cable.

In testimony whereof I affix my signature.

ARTHUR J. STRONG.